(12) United States Patent
Wechs et al.

(10) Patent No.: US 8,302,781 B2
(45) Date of Patent: *Nov. 6, 2012

(54) HIGH-FLUX DIALYSIS MEMBRANE WITH AN IMPROVED SEPARATION BEHAVIOUR

(75) Inventors: Friedbert Wechs, Worth (DE); Arne Gehlen, Taufkirchen (DE); Bodo Von Harten, Wuppertal (DE); Richard Kruger, Wuppertal (DE); Oliver Schuster, Schwelm (DE)

(73) Assignee: Membrana GmbH, Wuppertal (DE)

( * ) Notice: Subject to any disclaimer, the term of this patent is extended or adjusted under 35 U.S.C. 154(b) by 946 days.

This patent is subject to a terminal disclaimer.

(21) Appl. No.: 10/588,695

(22) PCT Filed: Feb. 15, 2005

(86) PCT No.: PCT/EP2005/001506
§ 371 (c)(1),
(2), (4) Date: Aug. 8, 2006

(87) PCT Pub. No.: WO2005/082502
PCT Pub. Date: Sep. 9, 2005

(65) Prior Publication Data
US 2008/0000828 A1    Jan. 3, 2008

(30) Foreign Application Priority Data
Feb. 19, 2004    (DE) .................. 10 2004 008 220

(51) Int. Cl.
*B01D 63/02*    (2006.01)
*B01D 67/00*    (2006.01)
*B01D 69/00*    (2006.01)
*B01D 69/08*    (2006.01)
B01D 39/14    (2006.01)

(52) U.S. Cl. ............ 210/496; 210/500.23; 264/515

(58) Field of Classification Search .......... 210/496, 210/500.23; 264/515
See application file for complete search history.

(56) References Cited

U.S. PATENT DOCUMENTS

| | | | |
|---|---|---|---|
| 4,604,208 A * | 8/1986 | Chu et al. ............ | 210/636 |
| 4,906,375 A * | 3/1990 | Heilmann ............ | 210/500.23 |
| 5,290,448 A * | 3/1994 | Sluma et al. ............ | 210/500.23 |
| 5,505,859 A | 4/1996 | Dunweg et al. | |
| 5,683,584 A | 11/1997 | Wenthold et al. | |
| 5,762,798 A * | 6/1998 | Wenthold et al. ....... | 210/500.23 |
| 5,919,370 A * | 7/1999 | Rottger et al. ............ | 210/646 |
| 6,565,782 B1 * | 5/2003 | Wang et al. ............ | 264/41 |
| 6,632,361 B2 * | 10/2003 | Niklas et al. ............ | 210/500.27 |
| 7,811,507 B2 * | 10/2010 | Wechs et al. ............ | 264/562 |

FOREIGN PATENT DOCUMENTS

| | | |
|---|---|---|
| DE | 4230077 A1 | 3/1994 |
| EP | 0168783 A1 | 1/1986 |
| EP | 0305787 A1 | 3/1989 |
| EP | 0344581 A2 | 12/1989 |
| EP | 0568045 A1 | 11/1993 |
| EP | 0716859 A2 | 6/1996 |
| EP | 828553 | 11/1996 |
| EP | 0750938 A1 | 1/1997 |
| JP | 0494727 | 8/1992 |

* cited by examiner

*Primary Examiner* — Duane Smith
*Assistant Examiner* — Madeline Gonzalez
(74) *Attorney, Agent, or Firm* — Hammer & Associates, P.C.

(57) ABSTRACT

A hydrophilic, semipermeable hollow-fiber membrane for blood treatment, with an integrally asymmetric structure based on a synthetic polymer. The hollow-fiber membrane possesses on its inner surface a porous separating layer and an open-pored supporting layer adjoining the separating layer, and has an ultrafiltration rate in albumin solution of 25 to 60 ml/(h·m²·mmHg). The hollow-fiber membrane is free from pore-stabilizing additives, and has a minimum sieving coefficient for cytochrome c of 0.8 and maximum sieving coefficient for albumin of 0.005. Method for the preparation of such membranes based on coagulation induced by a non-solvent, whereby a spinning solution of a synthetic first polymer and possibly a hydrophilic second polymer is extruded into a hollow fiber through the annular slit of a hollow-fiber die with simultaneous extrusion of a coagulation medium as the interior filler through the central opening of the hollow-fiber die, the interior filler initiating coagulation in the interior of the hollow fiber as a result of which a separating layer on the inner surface of the hollow-fiber membrane is formed as well as the membrane structure, the method being characterized in that the interior filler contains a polyelectrolyte with negative fixed charges.

7 Claims, No Drawings

HIGH-FLUX DIALYSIS MEMBRANE WITH AN IMPROVED SEPARATION BEHAVIOUR

The invention relates to a hydrophilic, water-wettable, semipermeable hollow-fibre membrane, based on a synthetic first polymer, particularly for hemodialysis, hemodiafiltration and hemofiltration, the membrane possessing an open-pored, integrally asymmetric structure across its wall, a porous separating layer of thickness 0.1 to 2 µm on its inner surface facing the lumen, and an open-pored supporting layer adjoining the separating layer, and having an ultrafiltration rate in albumin solution in the range of 25 to 60 ml/(h·m²·mmHg). The invention further relates to a method for the production of such a membrane.

The invention is particularly directed to hollow-fibre membranes suitable for high-flux hemodialysis, hemodiafiltration and hemofiltration. In blood-treatment applications of this type, the removal of large quantities of water is essential. Moreover, in addition to the diffusive removal of low-molecular uremic toxins, convective removal of what are known as middle molecules, particularly low-molecular proteins, also occurs.

In the last few years, synthetic polymers such as polyamides and polyvinyl alcohols as well as, in particular, engineering plastics such as aromatic sulfone polymers, polyphenylene sulfides, polyetherimides and polyetherketone have increasingly been the subject of research, particularly for blood treatments such as hemodialysis, hemodiafiltration, and hemofiltration, on account of their outstanding physicochemical properties, and are now used as membrane material for hollow-fibre membranes. However, on account of the hydrophobic properties of the last-named polymers, membranes made from these polymers are not wettable by aqueous media. As a result, they either must not be completely dried, or must be filled with a pore-stabilising liquid such as glycerol or a polyethylene glycol for pore stabilisation. In the absence of such stabilisation, the permeability of the membrane is successively reduced with each drying operation and the separation characteristics of the membrane are changed. Even membranes based on a hydrophilic synthetic polymer, or those containing a hydrophilic polymer component, in addition to the membrane-forming hydrophobic polymer, to ensure adequate water-wettability of the membrane, are normally provided with a pore-filler to achieve stabilisation of the membrane structure during drying, and at least a certain separation efficiency in the middle-molecular region.

The object of hemodialysis, as also of hemodiafiltration and hemofiltration, is to remove from the blood to be treated not only the low-molecular kidney-targeted substances, such as uremic toxins and/or uremic markers e.g. urea, creatinine and phosphate, but also, in particular, low-molecular proteins such as $\beta_2$-microglobulin ($\beta_{2M}$). A large number of investigations have shown that low-molecular proteins cause complications during dialysis. Accumulation of $\beta_{2M}$ in the blood, for example, is regarded as a cause of amyloidosis and carpal tunnel syndrome. It is therefore being attempted to increase the permeability of the membranes to low-molecular proteins. However, this frequently results simultaneously in increased loss of valuable blood components such as albumin, which are required to remain in the blood during treatment.

DE 42 30 077 describes hydrophilic membranes for use in, inter alia, hemodialysis, that consist of a mixture of polysulfone and a sulfonated polysulfone. The membranes are post-treated with a glycerol-water mixture before drying, to stabilise the pores. According to the examples of DE 42 30 077, while some very low albumin permeabilities are achieved, with sieving coefficients for albumin in the region of 0.001 or lower, this is associated with relatively low permeabilities in the middle-molecular region, the maximum sieving coefficient for cytochrome c (molecular weight 12 500 daltons), which is used as a marker for $\beta_{2M}$, being 0.43. High sieving coefficients in the region of up to 0.87 for cytochrome c are attained only if a relatively high albumin permeability is tolerated, i.e. if the sieving coefficients for albumin lie in the region of up to 0.04. However, albumin permeabilities as high as these are associated with high albumin losses during dialysis and can therefore not be tolerated by dialysis patients.

EP 305 787 relates to asymmetric membranes, for example for hemodialysis, constructed from a synthetic first polymer, preferably a polyamide, and a hydrophilic second polymer such as a polyvinylpyrrolidone or a polyethylene glycol. The membranes have a structure composed of three layers, with a separating layer in the form of a dense and relatively thin skin, an underlying layer with a spongy structure, and, adjoining this, a third layer with a structure having large, finger-shaped pores. Structures of this type with finger pores are not preferred for application, however, because they result in comparatively low mechanical strengths, and relatively thick membrane walls are required to achieve adequate stability of the membranes. The examples of EP 305 787 reveal that these membranes are also post-treated with glycerol for stabilisation of the pore structure. Sieving coefficients of about 0.001 for albumin and between 0.6 and 0.8 for $\beta_{2M}$ are thus obtained for the membranes of EP 305 787.

The object of the invention of EP 344 581 was to provide membranes for hemodialysis without finger pores and without asymmetric pore sizes that allow removal of toxins such as $\beta_{2M}$ and retention of useful components like albumin with high efficiency. The membranes of EP 344 581 consist of a mixture of a polyarylate and a polysulfone, and have a homogeneous and uniform fibrillated structure across the membrane cross-section. The membranes disclosed in EP 344 581 are hydrophobic on account of their polymer composition, and, according to EP 344 581, must either be treated with glycerol before drying, or initially rinsed with, for example, an alcohol, which is then substituted by water.

EP 168 783 describes a hydrophilic, asymmetric, microporous, polysulfone hollow-fibre membrane for hemodialysis, with an open-pored, foam-like supporting structure. The hydrophilicity is achieved by means of a proportion of 1 to 10 wt. % of a hydrophilic polymer, which is preferably polyvinylpyrrolidone. According to EP 168 783, the aim is to bring the separation behaviour of the membranes as close as possible to that of the natural kidney. For this purpose the membranes of EP 168 783 possess an inner porous separating layer with an exclusion limit for molecules of molecular weight between 30 000 and 40 000 daltons. In a preferred embodiment, the membranes of EP 168 783 have a sieving coefficient of 0.005 for human albumin, with a molecular weight of 65 000 daltons.

EP 828 553 discloses integral, multi-asymmetric membranes made from polymers soluble in ε-caprolactam, for use in hemodialysis, hemodiafiltration or hemofiltration. The membranes of EP 828 553 have a three-layer structure with a thin separating layer, an adjoining sponge-like, large-pore supporting layer without finger pores, and a third layer, adjoining the supporting layer, in which the pore size is smaller than in the supporting layer and which determines the hydraulic permeability of the membrane. In its examples, EP 828 553 discloses a membrane with a sieving coefficient for cytochrome c of 0.75, combined with a sieving coefficient for albumin of 0.05.

EP 716 859 refers to membranes with a homogeneous membrane structure, i.e. a membrane structure without asymmetry over the cross-section of the wall. The membranes are based on, for example, polysulfone, polyethersulfone, or polyarylsulfone, a hydrophilic polymer such as polyvinylpyrrolidone or polyethylene glycol being added to increase the hydrophilicity of the membranes. The membranes of EP 716 859 are impregnated with a glycerol solution after coagulation and before drying, to preserve the membrane structure. Sieving coefficients for albumin that are lower than 0.01 are indicated, without further specification, for the membranes produced according to the examples. For low filtrate flow rates of 10 ml/min, sieving coefficients of up to 0.88 can be attained for $\beta_{2M}$ with the stabilised membranes; for higher filtrate flow rates, i.e. filtrate flow rates of 50 ml/min, the sieving coefficients for $\beta_{2M}$ reach a maximum of 0.75. However, for these membranes, the ultrafiltration rates achieved for water and for blood, which are comparable with the corresponding ultrafiltration rates in albumin solution, are relatively low on account of the homogeneous membrane structure and lie below the rates normally used in hemodiafiltration and hemofiltration.

The object of the present invention is to provide hollow-fibre membranes appropriate for hemodialysis, hemodiafiltration and hemofiltration that have high hydraulic permeability and improved separation behaviour as compared with state-of-the-art membranes, so as to allow in particular efficient removal of low-molecular proteins from the blood to be treated, with simultaneous high retention of valuable blood components. The membranes should possess high mechanical stability, have stable performance characteristics even after drying, and allow unproblematic production of dialysers containing these hollow-fibre membranes.

It is a further object of the invention to provide a method for producing hollow-fibre membranes of this type.

The object of the invention is achieved firstly by a hydrophilic, water-wettable, semipermeable hollow-fibre membrane, based on a synthetic first polymer, particularly for hemodialysis, hemodiafiltration or hemofiltration, the membrane possessing an open-pored, integrally asymmetric structure across its wall, a porous separating layer with a thickness of 0.1 to 2 μm on its inner surface facing the lumen, and an open-pored supporting layer adjoining the separating layer, and having an ultrafiltration rate in albumin solution in the range of 25 to 60 ml/(h·m²·mmHg), the hollow-fibre membrane being characterised in that, after prior drying, it has a minimum sieving coefficient for cytochrome c of 0.80 combined with a maximum sieving coefficient for albumin of 0.005, whereby the hollow-fibre membranes in the dry state are free from additives that stabilise the pores in the membrane wall.

The object of the invention is further achieved by a method for producing these hollow-fibre membranes, comprising the following steps:

a. preparing a homogeneous spinning solution comprising 12 to 30 wt. % of a synthetic first polymer and, if applicable, other additives in a solvent system,
b. extruding the spinning solution through the annular slit of a hollow-fibre die to give a hollow fibre,
c. extruding an interior filler through the central opening of the hollow-fibre die the interior filler being a coagulation medium for the synthetic first polymer and comprising a solvent and a non-solvent for the synthetic first polymer,
d. bringing the interior filler into contact with the inner surface of the hollow fibre, to initiate coagulation in the interior of the hollow fibre and for formation of a separating layer on the inner surface of the hollow fibre and formation of the membrane structure,
e. passing the hollow fibre through a coagulation bath to complete the formation of the membrane structure if necessary, and to fix the membrane structure,
f. extracting the hollow-fibre membrane thus formed, to remove the solvent system and soluble substances, and
g. drying the hollow-fibre membrane,
the method being characterised in that the interior filler contains a polyelectrolyte with negative fixed charges, as a result of which a hollow-fibre membrane is obtained with a minimum sieving coefficient for cytochrome c of 0.80 combined with a maximum sieving coefficient for albumin of 0.005.

The membranes of the invention have excellent separation properties with sharp separation characteristics. They allow excellent elimination of low-molecular proteins along with excellent retention of albumin, without the need to stabilise the pores by post-treatment of the membranes with a liquid pore stabiliser such as glycerol or polyethylene glycol. On account of the sharp separation characteristics and the excellent retention of albumin, the structure and separating layer of the membrane of the invention can be implemented so as to be more open, without the sieving coefficients for albumin exceeding the limits required by the invention. This allows a further increase in the sieving coefficients for cytochrome c, and simultaneously a further improvement in the elimination of low-molecular proteins such as $\beta_2$-microglobulin.

The membranes of the invention generally also show improved pyrogen retention. For application in dialysis, the extent to which the membrane used for the blood treatment can inhibit transfer of endotoxins and pyrogens through the membrane wall is of relevance. According to previous studies, in many dialysis centres pyrogens have been detected particularly in the dialysis liquid. This gives rise to the risk, particularly with high-flux membranes, of pyrogens or biologically active endotoxin fragments passing through the membrane wall. The membranes of the invention are essentially impermeable to pyrogens, thereby providing a higher degree of safety for dialysis patients.

In the context of the present invention, an integrally asymmetric membrane is understood to be a membrane in which the separating layer and supporting layer consist of the same material and were formed together directly when the membrane was produced, as a result of which the layers are bound to each other as an integral unit. The only difference observed on passing from the separating layer to the supporting layer is a change relating to the membrane structure. The pore size in the support structure changes across the wall thickness from the separating layer onward in the integrally asymmetric membrane. This is to be contrasted with, on the one hand, composite membranes having a multilayer structure obtained by applying a dense layer as a separating layer on top of a porous, often microporous, supporting layer or supporting membrane in a separate process step. As a result, the materials that make up the supporting layer and the separating layer in composite membranes also have different properties. In symmetric membranes or homogeneous membranes, on the other hand, the size of the membrane pores is essentially uniform, i.e., does not change significantly, across the membrane wall. On account of the low thickness of the separating layer, integrally asymmetric membranes offer the advantage over symmetric, homogeneous membranes, i.e. membranes for which pore size is uniform across the wall thickness, of a significant reduction in hydraulic resistance and therefore improved convective transport even of substances in the middle-molecular range. In addition, they also allow independent control of the hydraulic permeability and separation characteristics of the membrane.

In general, the treatment or loading of state-of-the-art membranes with, e.g., glycerol promotes stabilisation of the pore structure, and is often carried out for state-of-the-art membranes to ensure certain separation efficiencies in the membrane even after the necessary drying step in the processing of the membrane. In the processing of hollow-fibre membranes to produce a dialyser, however, glycerol-containing membranes give rise to disadvantages, for example in the usual embedding of the ends of the hollow-fibre membranes in an embedding resin. The glycerol-containing membranes often adhere to one another, so that the embedding material, e.g. polyurethane, cannot penetrate into the intermediate spaces between the hollow-fibre membranes. This results in imperfect sealing in the embeddings. Moreover, dialysers containing glycerol-loaded membranes require extensive flushing before use, i.e. before use for blood purification, in order to free the membranes from glycerol. In addition, these state-of-the-art membranes may not be dried after the glycerol has been removed, because drying causes significant deterioration of the separation characteristics, and in particular a marked reduction of separation efficiency in the middle-molecular range, i.e. for low-molecular proteins, as well as, in some cases, deterioration of wetting behaviour.

In contrast, the hollow-fibre membranes of the invention remain wettable with water or aqueous media even after drying, on account of their hydrophilic properties. Moreover, they retain their characteristic separation properties after drying, i.e. in the dry state, even if they were not post-treated, e.g. with a glycerol solution, after extraction and before drying. They retain their characteristic separation properties even if the hollow-fibre membranes in the dry state, i.e. after drying, are free from additives that stabilise the pores in the membrane wall and also if in the dry state of the hollow-fibre membranes of the invention the pores in the membrane wall contain no additives, such as glycerol, that stabilise them. In contrast to state-of-the-art membranes the membranes of the invention have stable and excellent separation characteristics, and therefore improved separation behaviour.

The membrane of the invention can of course be loaded with glycerol after drying, if this is considered appropriate. In contrast to known hollow-fibre membranes, the hollow-fibre membrane of the invention retains its properties, including its sharp separation characteristics, even after removal of the glycerol and subsequent drying. As stated above, the hollow-fibre membrane of the invention retains its properties after extraction and drying, even in the absence of treatment with pore-stabilising additives before drying. In regard to the sharp separation characteristics, it is, in addition, immaterial whether the membrane has been subjected to subsequent sterilisation, as is usual during the production of dialysers. The present invention therefore encompasses also sterilised membranes.

The hollow-fibre membrane of the invention preferably has a minimum sieving coefficient for cytochrome c of 0.85, and especially preferably of 0.9. In a further preferred embodiment of the invention, the maximum sieving coefficient for albumin is 0.003. In an advantageous embodiment, the hollow-fibre membrane of the invention has a minimum sieving coefficient for cytochrome c of 0.85, combined with a maximum sieving coefficient for albumin of 0.003. Especially preferred are hollow-fibre membranes of the invention with a minimum sieving coefficient for cytochrome c of 0.9, combined with a maximum sieving coefficient for albumin of 0.003.

According to the invention, the hollow-fibre membrane has an ultrafiltration rate in albumin solution in the range of 25 to 60 ml/(h·m²·mmHg). An ultrafiltration rate in albumin solution below 25 ml/(h·m²·mmHg) is not adequate for the removal of large quantities of water in blood treatment, and membranes with low ultrafiltration rates such as these are not adequately efficient for use in the area of high-flux hemodialysis, hemodiafiltration or hemofiltration. For ultrafiltration rates in albumin solution above 60 ml/(h·m²·mmHg), on the other hand, the risk exists during dialysis treatment of an extremely low or even negative transmembrane pressure being indicated at the dialysis machine, which can lead to alarm signals and may even necessitate corrective intervention in dialysis treatment. The ultrafiltration rate in albumin solution for the membranes of the invention preferably lies in the range of 30 to 55 ml/(h·m²·mmHg).

The first polymer constituting the membrane structure of the hydrophilic hollow-fibre membrane is, according to the invention, a synthetic polymer that, in the method of the invention, is contained in the spinning solution in a concentration of 12 to 30 wt. %. This synthetic first polymer can be a hydrophilic synthetic polymer or a mixture of various hydrophilic synthetic polymers. Thus, for example, hydrophilic polyamides, polyvinyl alcohols, ethylene vinyl alcohol copolymers, polyether polyamide block copolymers, polyethylene oxide polycarbonate copolymers, or modified, originally hydrophobic polymers such as polyethersulfones or polysulfones hydrophilically modified with sulfonic acid groups can be used.

In the production of the membranes of the invention using a hydrophilic first polymer, the spinning solution can contain, as an additional component, a hydrophilic second polymer, which has the effect of increasing the viscosity in the spinning solution and/or functions also as a nucleating agent and pore-forming agent in the formation of the membrane structure.

In a preferred embodiment, the synthetic first polymer constituting the hollow-fibre membrane of the invention is a hydrophobic first polymer, which is combined with a hydrophilic second polymer. If a hydrophobic first polymer is used, the hydrophilic second polymer, in addition to increasing the viscosity of the spinning solution and/or functioning as a nucleating agent and pore-former in the method of the invention, also has the function of ensuring the hydrophilicity of the hollow-fibre membrane of the invention. This preferred hollow-fibre membrane therefore comprises a hydrophobic first polymer and a hydrophilic second polymer.

If a hydrophilic second polymer is used, its concentration in the spinning solution is 0.1 to 30 wt. % relative to the weight of the spinning solution. The concentration of the hydrophilic second polymer in the spinning solution is preferably 1 to 25 wt. % and especially preferably 5 to 17 wt. % relative to the weight of the spinning solution.

For the method of the invention, the polymers that can be used as the synthetic first polymer are those that have good solubility in polar aprotic solvents and can be precipitated out from these with the formation of asymmetric membranes. In the context of the present invention, engineering plastics from the group of aromatic sulfone polymers (such as polysulfone, polyethersulfone, polyphenylenesulfone or polyarylethersulfone), polycarbonates, polyimides, polyetherimides, polyetherketones, polyphenylene sulfides, copolymers or modifications of these polymers, or mixtures thereof are used as preferred hydrophobic first polymers that are membrane-forming, i.e. that constitute the structure of the hollow-fibre membranes of the invention. In a particularly preferred embodiment, the hydrophobic first polymer is a polysulfone or a polyethersulfone with the repeating molecular units shown in formulas (I) and (II):

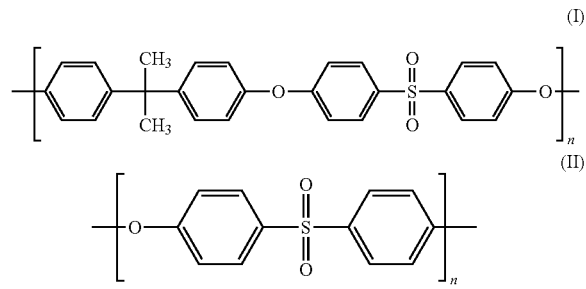

The hollow-fibre membranes of the invention can essentially be produced by methods known in the state of the art for production from a synthetic polymer of hydrophilic, water-wettable, semipermeable hollow-fibre membranes that have an integrally asymmetric structure and a separating layer on the inner surface. Such state-of-the-art methods based on coagulation induced by a non-solvent are described in, for example, EP 168 783, EP 568 045, EP 750 938 and EP 828 553, reference to the relevant disclosures of which is hereby explicitly made. On the basis of the methods described therein, for example, an interior filler is used, according to the method of the invention, that contains a polyelectrolyte with negative fixed charges to form a hollow-fibre membrane with a minimum sieving coefficient for cytochrome c of 0.80 combined with a maximum sieving coefficient for albumin of 0.005.

According to the invention, the concentration of the synthetic first polymer in the spinning solution is 12 to 30 wt. %. Concentrations below 12 wt. % give rise to disadvantages in the execution of the spinning process and in regard to the mechanical stability of the hollow-fibre membrane produced. On the other hand, membranes obtained from spinning solutions containing more than 30 wt. % of the synthetic first polymer have a structure that is too dense and permeabilities that are too low. The spinning solution preferably contains 15 to 25 wt. % of the synthetic first polymer. The synthetic first polymer can also contain additives such as antioxidants, nucleating agents, UV absorbers, etc. to modify the properties of the membranes in a targeted manner.

The hydrophilic second polymers used are advantageously long-chain polymers that are compatible with the synthetic first polymer, and have repeating polymer units that are in themselves hydrophilic. The hydrophilic second polymer is preferably polyvinylpyrrolidone, polyethylene glycol, polyvinyl alcohol, polyglycol monoester, a polysorbate, such as polyoxyethylene sorbitan monooleate, carboxylmethylcellulose, or a modification or copolymer of these polymers. Polyvinylpyrrolidone is especially preferred. In a further preferred embodiment, it is also possible to use mixtures of various hydrophilic polymers and particularly mixtures of hydrophilic polymers of different molecular weights, e.g. mixtures of polymers whose molecular weights differ by a factor of 5 or more.

A considerable proportion of the hydrophilic second polymer is washed out of the membrane structure during production of the hollow-fibre membrane of the invention. In view of the hydrophilic properties of the hollow-fibre membranes of the invention and their wettability, however, it is necessary, in the case of the preferred use of a hydrophobic first polymer as synthetic first polymer, that a certain proportion of the hydrophilic second polymer remain in the membrane. In the case of the preferred use of a hydrophobic first polymer as synthetic first polymer, therefore, the finished hollow-fibre membrane preferably contains the hydrophilic second polymer in a concentration in the range of 1 to 15 wt. % and especially preferably in the range 3 to 10 wt. %, relative to the weight of the finished hollow-fibre membrane. In addition, the hydrophilic second polymer can be chemically or physically modified even in the finished membrane. Polyvinylpyrrolidone, for example, can subsequently be made water-insoluble through crosslinking.

The solvent system to be used must be coordinated with the synthetic first polymer used and, if necessary, with the hydrophilic second polymer. According to the invention, the solvent system used to prepare the spinning solution comprises polar aprotic solvents such as, in particular, dimethylformamide, dimethylacetamide, dimethyl sulfoxide, N-methylpyrrolidone or $\epsilon$-caprolactam, or mixtures of these solvents with one another. The solvent system can contain additional cosolvents; where $\epsilon$-caprolactam is used, butyrolactone, propylene carbonate or polyalkylene glycol have proved useful for this purpose. In addition, the solvent system can also contain non-solvents for the polymer such as water, glycerol, polyethylene glycols, or alcohols such as ethanol or isopropanol.

After degassing and filtration to remove undissolved particles, the homogeneous spinning solution is extruded into a hollow fibre through the annular slit of a conventional hollow-fibre die. Through the central die opening, which is positioned coaxially with the annular slit in the hollow-fibre die, an interior filler is extruded that is a coagulation medium for the hydrophobic first polymer and that simultaneously stabilises the lumen of the hollow fibre.

The interior filler, i.e. the inner coagulation medium, consists of one of the above-mentioned solvents, preferably a solvent that is also used in the solvent system of the spinning solution, or the solvent system used to prepare the spinning solution, as well as, necessarily, a non-solvent. This non-solvent should initiate the coagulation of the synthetic first polymer, but should preferably dissolve the hydrophilic second polymer that may be present. If a non-solvent is contained in the solvent system, the non-solvent contained in the interior filler can be the same, whereby to attain an adequate precipitating effect the non-solvent concentration in the interior filler is naturally higher than that in the solvent system. However, the non-solvent used for the interior filler can be different from that used for the solvent system. The non-solvent used can also comprise a number of different non-solvent components.

According to the invention, the interior filler contains a polyelectrolyte with negative fixed charges, the polyelectrolyte in the interior filler being in dissolved form. In the context of the present invention, a polyelectrolyte with negative fixed charges is understood to be a polymer that contains functional groups with negative charges, or that can form such groups in an adequately basic medium, the functional groups being covalently bound to the polymer. As a result, the negative charges are also necessarily covalently, and therefore firmly bound to the polymer.

It is important that the polyelectrolyte with negative fixed charges used in the invention be in fact a polymer with the properties defined above, i.e. a molecule in which a large number, preferably at least a few hundred and especially preferably at least a few thousand, monomer units are covalently bound, resulting in a molecular weight that lies preferably in the range>7 000 daltons and especially preferably in the range>70 000 daltons. The use in the interior filler of low-molecular electrolytes with negative fixed charges, such as citric acid, whose three acid groups can form three negative ions, results in membranes that do not have increased separation efficiency. It is also important that the polyelectrolyte used in the invention possesses negative fixed charges. If polyelectrolytes with positive fixed charges, such as a copolymer of vinylpyrrolidone and methacrylamidopropyl trimethyl ammonium chloride, are added to the interior filler, the resulting membranes again show no increased separation efficiency.

In a preferred embodiment of the invention, the polyelectrolyte with negative fixed charges is selected from the group of polyphosphoric acids, polysulfonic acids or polycarboxylic acids, and particularly, in the last case, homo- and copolymers of acrylic acid. Partially crosslinked acrylic acids, copolymers of methacrylic acid and methyl methacrylate, copolymers of acrylic acid and vinylpyrrolidone, and copolymers of acrylic acid, vinylpyrrolidone and lauryl methacrylate have proved to be particularly effective in regard to improvement of the separation behaviour of the hollow-fibre membranes.

A particularly marked increase of separation efficiency is observed when the polyelectrolyte with negative fixed charges is so chosen as to be completely soluble in the interior filler that acts as the precipitant, but not in the individual components of the interior filler. Moreover, a particularly marked increase of separation efficiency is observed when the polyelectrolyte with negative fixed charges used for the invention is chosen so that it precipitates in contact with the spinning solution.

The concentration of the polyelectrolyte with negative fixed charges in the interior filler is preferably 0.01 to 5 wt. % relative to the weight of interior filler. For concentrations below 0.01 wt. %, the sharp separation characteristics of the invention are no longer obtained. If, on the other hand, the concentration of the polyelectrolyte used for the invention lies above 5 wt. %, the solubility of the additive in the interior filler, and therefore adequate spinning stability, can no longer be ensured. Moreover, concentrations above 5 wt. % often lead to reduction in the permeabilities of the membranes. The particularly preferred concentration of the polyelectrolyte with negative fixed charges is 0.05 to 1 wt. %.

The precipitating effect of the interior filler must be so adjusted that a separating layer is formed on the inner surface, i.e. the lumen-facing side, of the hollow-fibre membrane, and an adjoining supporting layer facing toward the outside of the hollow-fibre membrane. In combination with the addition of a polyelectrolyte with negative fixed charges to the interior filler, the method of the invention allows production for the first time of hollow-fibre membranes that show the sharp separation characteristics required by the invention, even after drying and without prior treatment with an additive, such as glycerol, that stabilises the pores in the membrane wall. It is assumed that the polyelectrolyte with negative fixed charges influences the formation of the separating layer, and particularly the formation of the pores in the separating layer, towards a narrower pore-size distribution, and also influences the surface polarity of the membrane. The latter has the effect of a change in the secondary membrane when the membranes of the invention are used. It is further assumed that the changes in respect of the separating layer are also the cause of the greater security of the membranes of the invention against the passage of pyrogens.

The polyelectrolyte with negative fixed charges is physically bound in the separating layer. This means that the said polyelectrolyte is not chemically bound in the separating layer of the membrane of the invention. The physical binding of the polyelectrolyte in the separating layer is so stable that neither washing and extraction, which are unavoidable during wet-chemical production of the membrane, nor sterilisation and the use of the membrane of the invention lead to significant loss of polyelectrolyte from the membrane, or to a membrane free from polyelectrolyte. A tentative explanation is that the polyelectrolyte is securely anchored in the separating layer of the membrane of the invention by interlocking and entanglement between the polymer chains of the polyelectrolyte and those of the membrane-forming polymer, as occur, for example, during the method of the invention by bringing the inner surface of the solvent-containing hollow fibre formed in step b) into contact with the polyelectrolyte-containing interior filling.

Suitable detection methods such as ESCA/XPS, IR-spectroscopic evidence as obtained from Fourier transform infrared spectroscopy (FTIR-ATR), and reaction of the acid polyelectrolyte with basic dyes establish that in the hollow-fibre membranes produced by the method of the invention, polyelectrolyte with negative fixed charges is contained in the separating layer. The major part of the supporting layer, on the other hand, is essentially free from polyelectrolyte with negative fixed charges.

Depending on the structure desired for the supporting layer adjoining the separating layer and in the region of the outer surface of the hollow-fibre membrane, the hollow fibre, in a preferred embodiment of the method of the invention, following its exit from the hollow-fibre die, first traverses an air gap before being immersed in an outer coagulation bath and passed through this. The airgap is especially preferably conditioned and temperature-controlled with water vapour, to set defined conditions before the start of coagulation on the outside of the hollow fibre, e.g. by dosed uptake of non-solvent from the conditioned atmosphere, as a result of which deferred precoagulation occurs. The diffusion-induced coagulation can then be completed in the outer coagulation bath, which is preferably temperature controlled and preferably an aqueous bath, and the membrane structure can be fixed. However, if, on account of the precipitating effect of the interior liquid, the hollow fibre is fully precipitated from the interior to the exterior before its immersion in the outer coagulation bath, the sole functions of the outer coagulation bath are to fix the membrane structure and ensure extraction of the hollow-fibre membrane. Instead of using a conditioned air gap that retards coagulation on the outside of the hollow fibre, extrusion can also be carried out directly into an outer coagulation bath that has a weaker precipitating effect than the interior filler.

Following the coagulation and the fixing of the membrane structure, the hollow-fibre membrane so obtained is extracted to free it from residues of the solvent system and other soluble organic substances. If a hydrophilic second polymer is used, a significant proportion of the hydrophilic second polymer is normally also removed during extraction. If a hydrophobic first polymer is used, however, part of the hydrophilic second polymer remains in the membrane of the invention to ensure sufficient hydrophilicity and wettability. The concentration of the hydrophilic second polymer is then preferably 1 to 15 wt. %, and especially preferably 3 to 10 wt. %, relative to the weight of the membrane of the invention.

After the extraction the hollow-fibre membranes are dried, textured, if necessary, to improve the exchange properties of the hollow-fibre membranes in the subsequent bundle, and finally, for example, wound up on a bobbin or processed into bundles with a suitable fibre count and length, by the usual methods. The hollow-fibre membranes can also be provided with supplementary threads, e.g. in the form of multifilament yarns, before production of the bundles, to ensure separation of the hollow-fibre membranes from one other and allow better flow around individual hollow-fibre membranes.

It is also possible to crosslink the residual hydrophilic second polymer in the hollow-fibre membrane of the invention by, for example, irradiation and/or application of heat, to make it insoluble and prevent its being washed out in later application. The usual known state-of-the-art methods can be used for this purpose.

In a preferred embodiment of the hollow-fibre membranes of the invention, the supporting layer extends from the separating layer across essentially the entire wall of the hollow-fibre membrane, and has a sponge-like structure that is free from finger pores. Membranes of this type possess higher mechanical strength than membranes with large, cavernous pores, i.e. having a structure with finger pores. This allows lower wall thicknesses and consequently a larger range in relation to the hydraulic permeability of the membranes of the invention.

The internal diameter of the membranes of the invention is preferably 100 to 500 μm and especially preferably 150 to 300 μm. The wall thickness is preferably between 10 and 60 μm and especially preferably between 25 and 45 μm.

In another preferred embodiment of the invention, the sponge-like supporting layer adjoins, on the side facing away from the separating layer, a layer whose pores are of a lower size than those in the supporting layer, and in which the pore size decreases in the direction toward the outside, or the structure of the sponge-like supporting layer becomes more dense in the outer region of the membrane wall toward the outer surface. Membranes with such pore structures are described in EP 828 553, to the disclosures of which reference is hereby explicitly made, as stated above.

The invention will now be described in more detail with the help of the examples below.

The following methods have been used in the examples for characterisation of the membranes obtained:

Ultrafiltration Rate in Albumin Solution, Sieving Coefficients for Cytochrome C and Albumin.

The ultrafiltration rate in albumin solution (BSA solution), denoted below by $UFR_{Alb}$, and the sieving coefficients for cytochrome c, $SC_{CC}$, and albumin, $SC_{Alb}$, are determined following DIN 58 353 Part 2.

A phosphate buffered saline solution (PBS) containing 50 g/l of bovine serum albumin (BSA) and 100 mg/l of cytochrome c is used as the test solution. The formulation of the PBS solution is from the German Pharmacopoeia (DAB 10.1, Supplement VII.I.3, 1992, Phosphate Buffer Solution, pH 7.4, Containing Sodium Chloride R, ["Phosphatpufferlösung pH 7.4, natriumchloridhaltige R"]). The measurement is performed on hollow-fibre membrane modules with an effective membrane surface area of approx. 250 cm² and an effective hollow-fibre membrane length of 180 mm. Measurements are performed at 37° C. A flow rate $Q_B$ of 200 ml/(min·m²) through the hollow-fibre membranes is established by means of a first pump on the inlet side of the membrane module, and a filtrate flow rate of $Q_F$=30 ml/(min·m²) through the membrane wall is set by regulation of a second pump on the outlet side of the membrane module in relation to the first pump on the inlet side. The transmembrane pressure (TMP) that is established as a result of the filtrate flow rate $Q_F$ is recorded during the measurement.

$UFR_{Alb}$ is calculated from the formula:

$$UFR_{Alb} = \frac{Q_F \cdot 60}{TMP \cdot 0.75} [ml/(h \cdot m^2 \cdot mmHg)],$$

where
$Q_F$=filtrate flow rate in [ml/(min·m²)] relative to an effective membrane area of 1 m²
TMP=transmembrane pressure in [hPa]

The sieving coefficients SC are determined using the formula $$SC = \frac{2 \cdot c_F}{c_{ST} + c_R},$$

where
$c_F$=concentration of albumin or cytochrome c in the filtrate
$c_{ST}$=original (stock) concentration of the albumin or cytochrome c
$c_R$=concentration of albumin or cytochrome c in the retentate The BSA concentration is determined by a method of Boehringer Mannheim that uses an automatic analyser for clinical chemistry, such as a Hitachi 704 Automatic Analyzer. The determination is based on a bromocresol green method. Cytochrome c is also determined by means of the Hitachi 704. To eliminate interference from BSA in measuring the extinction for cytochrome c at the wavelength λ=415 nm, a dilution series of BSA in PBS from 0 to approx. 80 g/l of BSA must first be measured, and the slope of the straight line obtained by plotting the extinction at λ=415 nm against the BSA concentration determined. The correction factor is obtained from the slope and the current concentration $c_{ST}$ of BSA in the sample.

COMPARATIVE EXAMPLE 1

A homogeneous spinning solution is prepared from 19.5 wt. % of polyethersulfone (Ultrason E 6020 from BASF) and 13.65 wt. % of polyvinylpyrrolidone (PVP K30 from ISP) in 31.75 wt. % of ε-caprolactam, 31.75 wt. % of γ-butyrolactone and 3.35 wt. % of glycerol by intensive mixing at a temperature of approx. 100° C. The solution obtained is cooled to approx. 60° C., degassed, filtered, and conveyed to the annular slit of a hollow-fibre die that is maintained at a temperature of 67° C. For the formation of the lumen and the inner separating layer, an interior filler consisting of ε-caprolactam, glycerol and water in the ratio 61:4:35 by weight is extruded through the needle of the hollow-fibre die. The hollow fibre formed is conducted through a conditioning channel (approx. 55° C., relative humidity 80%), and is precipitated and fixed by means of the interior filler and by passing it through a bath containing water at approx. 75° C. The hollow-fibre membrane so obtained is then washed with water at approx. 90° C. and dried. This results in a hollow-fibre membrane with a lumen diameter of approx. 0.2 mm and a wall thickness of approx. 0.03 mm. Table 1 shows the ultrafiltration rate obtained for this membrane in albumin solution, $UFR_{Alb}$, along with the sieving coefficient for cytochrome c, $SC_{CC}$, and the sieving coefficient for albumin, $SC_{Alb}$.

EXAMPLE 1A

A hollow-fibre membrane is produced as in comparative example 1, except that 0.25 wt. % of the polyelectrolyte Acrylidone ACP 1005 (from ISP), relative to the weight of interior filler, is also dissolved in the interior filler. Acrylidone ACP 1005 is a copolymer of 75% acrylic acid and 25% vinylpyrrolidone. To produce the interior filler, the mixture of ε-caprolactam and water is first prepared, the Acrylidone ACP 1005 is dissolved in this mixture, and glycerol is finally added. The results are shown in Table 1.

EXAMPLE 1B

A hollow-fibre membrane is produced as in comparative example 1, except that 0.25 wt. % of the polyelectrolyte Rohagit S hv (from Degussa/Röhm), relative to the weight of the interior filler, is also dissolved in the interior filler. Rohagit S hv is a copolymer of methacrylic acid and methyl methacrylate. To produce the interior filler, the mixture of ε-caprolactam and water is first prepared, the Rohagit S hv is dissolved in this mixture, and glycerol is finally added.

Table 1 shows $UFR_{Alb}$, $SC_{CC}$ and $SC_{Alb}$.

TABLE 1

| Membrane from | Polyelectrolyte in the interior filler | $UFR_{Alb}$ ml/(h·m²·mmHg) | $SC_{ALB}$ | $SC_{CC}$ |
|---|---|---|---|---|
| Comparative example 1 | — | 37.9 | 0.009 | 0.730 |
| Example 1a | 0.25 wt. % of ACP 1005 | 35.1 | 0.001 | 0.950 |
| Example 1b | 0.25 wt. % of Rohagit S hv | 38.7 | 0.001 | 0.952 |

As Table 1 shows, the addition of polyelectrolytes to the interior filler results in hollow-fibre membranes with considerably increased selectivity for separation of albumin and cytochrome c at approximately the same ultrafiltration rate.

COMPARATIVE EXAMPLE 2

A homogeneous spinning solution is prepared from 19.0 wt. % of polyethersulfone (Ultrason E 6020 from BASF), 13.68 wt. % of polyvinylpyrrolidone (PVP K30 from ISP), 31.98 wt. % of ε-caprolactam, 31.98 wt. % of γ-butyrolactone and 3.36 wt. % of glycerol by intensive mixing at a temperature of approx. 100° C. From the resulting solution, a hollow-fibre membrane with a lumen diameter of approx. 0.2 mm and a wall thickness of approx. 0.035 mm is produced by the method described for comparative example 1. The die temperature is 62° C. For the formation of the lumen and the separating layer, an interior filler consisting of β-caprolactam and water in the ratio 55:45 by weight is extruded through the needle of the hollow-fibre die. Table 2 shows the results obtained for this membrane.

EXAMPLE 2

A hollow-fibre membrane is produced as in comparative example 2, except that 0.5 wt. % of the polyelectrolyte Acrylidone ACP 1005 (from ISP), relative to the weight of interior filler, is also dissolved in the interior filler. To produce the interior filler, the mixture of ε-caprolactam and water is first prepared, and the Acrylidone ACP 1005 is dissolved in this mixture.

Table 2 shows the $UFR_{Alb}$, $SC_{CC}$ and $SC_{Alb}$ for the hollow-fibre membrane obtained.

TABLE 2

| Membrane from | Polyelectrolyte in the interior filler | $UFR_{Alb}$ ml/(h·m²·mmHg) | $SC_{Alb}$ | $SC_{CC}$ |
|---|---|---|---|---|
| Comparative example 2 | — | 35.2 | 0.008 | 0.594 |
| Example 2 | 0.5 wt. % of ACP 1005 | 41.6 | 0.000 | 0.944 |

As Table 2 shows, the addition of polyelectrolyte to the interior filler results in a hollow-fibre membrane with considerably increased selectivity for separation of albumin and cytochrome c.

COMPARATIVE EXAMPLE 3

A spinning solution is prepared by intensive mixing of 19.0 wt. % of polyethersulfone (Ultrason E 6020 from BASF) and 13.3 wt. % of polyvinylpyrrolidone (PVP K30 from ISP) with 63.64 wt. % of dimethylacetamide (DMAC), and 4.06 wt. % of water at a temperature of approx. 70° C. The resulting homogeneous solution is cooled to approx. 50° C., degassed, filtered, and conveyed to the annular slit of a hollow-fibre die that is maintained at a temperature of 40° C. For the formation of the lumen and the inner separating layer, an interior filler consisting of 62 parts by weight of DMAC and 38 parts by weight of water is extruded through the needle of the hollow-fibre die. The hollow fibre formed is conducted through a conditioning channel (50° C., relative humidity 90%), and then precipitated in a coagulation bath containing water maintained at approx. 50° C. The hollow-fibre membrane so obtained is then washed with water at approx. 90° C. and dried at approx. 90° C. This results in a hollow-fibre membrane with a lumen diameter of approx. 0.2 mm and a wall thickness of approx. 0.035 mm. Table 3 shows the properties of the membrane so obtained.

EXAMPLE 3

A hollow-fibre membrane is produced as in comparative example 3, except that 0.5 wt. % of the polyelectrolyte Acrylidone ACP 1005 (from ISP), relative to the weight of interior filler, is also dissolved in the interior filler. To produce the interior filler, the Acrylidone ACP 1005 is first dispersed in the solvent, water is then added, and a homogeneous solution is prepared at approx. 70° C. The solution is finally cooled to 30° C.

Table 3 shows the $UFR_{Alb}$, $SC_{CC}$ and $SC_{Alb}$ for the hollow-fibre membrane of this example.

TABLE 3

| Membrane from | Polyelectrolyte in the interior filler | $UFR_{Alb}$ ml/(h·m²·mmHg) | $SC_{Alb}$ | $SC_{CC}$ |
|---|---|---|---|---|
| Comparative example 3 | — | 48.0 | 0.005 | 0.604 |
| Example 3 | 0.5 wt. % of ACP 1005 | 48.9 | 0.001 | 0.946 |

COMPARATIVE EXAMPLE 4

A homogeneous spinning solution is prepared by intensive mixing at approx. 70° C. of 19.0 wt. % polyethersulfone (Ultrason E 6020 from BASF), 13.3 wt. % of polyvinylpyrrolidone (PVP K30 from ISP), 62.96 wt. % of N-methylpyrrolidone (NMP) and 4.74 wt. % of water. The solution is cooed to approx. 60° C., degassed, filtered, and conveyed to the annular slit of a hollow-fibre die that is maintained at a temperature of 60° C. For the formation of the lumen and the separating layer, an interior filler consisting of 50 parts by weight of NMP and 50 parts by weight of water is extruded through the needle of the hollow-fibre die. The hollow fibre formed is conducted through a conditioning channel (50° C., relative humidity 90%), precipitated and fixed in water maintained at approx. 70° C., and then washed and dried. This results in a hollow-fibre membrane with a lumen diameter of 0.2 mm and a wall thickness of 0.035 mm.

EXAMPLE 4

A hollow-fibre membrane is produced as in comparative example 4, except that 0.5 wt. % of the polyelectrolyte Acrylidone ACP 1005 (from ISP), relative to the weight of interior filler, is also dissolved in the interior filler. To prepare the interior filler, the Acrylidone ACP 1005 is first dispersed in the NMP, water is then added, and a homogeneous solution is prepared at approx. 70° C. The solution is finally cooled to 30° C.

Table 4 shows the $UFR_{Alb}$, $SC_{CC}$ and $SC_{Alb}$ of the hollow-fibre membranes of comparative example 4 and example 4.

TABLE 4

| Membrane from | Polyelectrolyte in the interior filler | $UFR_{Alb}$ ml/(h · m² · mmHg) | $SC_{Alb}$ | $SC_{CC}$ |
|---|---|---|---|---|
| Comparative example 4 | — | 42.4 | 0.006 | 0.560 |
| Example 4 | 0.5 wt. % of ACP 1005 | 42.7 | 0.002 | 0.932 |

COMPARATIVE EXAMPLE 5

A homogeneous spinning solution is prepared from 19.0 wt. % of polyethersulfone (Ultrason E 6020 from BASF), 4.7.5 wt. % of polyvinylpyrrolidone (PVP K90 from ISP), 68.62 wt. % of dimethylacetamide (DMAC) and 7.63 wt. % of glycerol at a temperature of approx. 70° C. The solution is cooled to approx. 50° C., degassed, filtered, and conveyed to the annular slit of a hollow-fibre die that is maintained at a temperature of 45° C. For the formation of the lumen and the inner separating layer, an interior filler consisting of 47.5 parts by weight of DMAC, 47.5 parts by weight of water and 5 parts by weight of glycerol is used. The hollow fibre formed is conducted through a conditioning channel (50° C., relative humidity 90%), and precipitated and fixed in a coagulation bath containing water maintained at 70° C. The hollow-fibre membrane so obtained is then washed with water at approx. 90° C. and dried at approx. 90° C. This results in a hollow-fibre membrane with a lumen diameter of 0.2 mm and a wall thickness of 0.035 mm.

EXAMPLE 5

A polyethersulfone hollow-fibre membrane is produced as in comparative example 5, except that 0.5 wt. % of the polyelectrolyte Acrylidone ACP 1005 (from ISP), relative to the weight of interior filler, is also dissolved in the interior filler. To produce the interior filler, the Acrylidone ACP 1005 is first dispersed in the dimethylacetamide, water is then added, and a homogeneous solution is prepared at approx. 70° C. The solution is finally cooled to 30° C.

Table 5 shows the $UFR_{Alb}$, $SC_{CC}$ and $SC_{Alb}$ of the hollow-fibre membranes of comparative example 5 and example 5.

TABLE 5

| Membrane from | Polyelectrolyte in the interior filler | $UFR_{Alb}$ ml/(h · m² · mmHg) | $SC_{Alb}$ | $SC_{CC}$ |
|---|---|---|---|---|
| Comparative example 5 | — | 36.3 | 0.003 | 0.670 |
| Example 5 | 0.5 wt. % of ACP 1005 | 35.7 | 0.002 | 0.860 |

As Table 5 shows, addition of the polyelectrolyte ACP to the interior filler results in a polyethersulfone hollow-fibre membrane with significantly improved separation characteristics.

COMPARATIVE EXAMPLE 6

A homogeneous spinning solution is prepared from 19.0 wt. % of polysulfone (Ultrason S 6010 from BASF), 13.3 wt. % of polyvinylpyrrolidone (PVP K30 from ISP), 65.87 wt. % of N-methylpyrrolidone (NMP) and 1.83 wt. % of water. For this purpose the polysulfone is first stirred into the greater part of the NMP at a temperature of 70° C. and then homogeneously dissolved at 90° C. The PVP K30 is then added with stirring and likewise dissolved. The resulting solution is cooled to 50° C., and the water and the remaining NMP are then added. The resulting solution is degassed, filtered, and conveyed to the annular slit of a hollow-fibre die that is maintained at a temperature of 40° C. An interior filler consisting of 60 parts by weight of NMP and 40 parts by weight of water is extruded through the needle of the hollow-fibre die. The hollow fibre formed is conducted through a conditioning channel (50° C., relative humidity 90%), precipitated and fixed in a coagulation bath containing water maintained at 70° C., and then washed and dried. This results in a hollow-fibre membrane with a lumen diameter of 0.2 mm and a wall thickness of 0.035 mm.

EXAMPLE 6

A polysulfone hollow-fibre membrane is produced as in comparative example 6, except that 0.5 wt. % of the polyelectrolyte Acrylidone ACP 1005 (from ISP), relative to the weight of interior filler, is also dissolved in the interior filler. To produce the interior filler, the Acrylidone ACP 1005 is first dispersed in the NMP, water is then added, and a homogeneous solution is prepared at approx. 70° C. The solution is finally cooled to 30° C.

Table 6 shows the $UFR_{Alb}$, $SC_{CC}$ and $SC_{Alb}$ of the hollow-fibre membranes of comparative example 6 and example 6.

TABLE 6

| Membrane from | Polyelectrolyte in the interior filler | $UFR_{Alb}$ ml/(h · m² · mmHg) | $SC_{Alb}$ | $SC_{CC}$ |
|---|---|---|---|---|
| Comparative example 6 | — | 21.0 | 0.003 | 0.490 |
| Example 6 | 0.5 wt. % of ACP 1005 | 25.0 | 0.001 | 0.811 |

COMPARATIVE EXAMPLE 7

A homogeneous spinning solution is prepared from 19.0 wt. % of polyetherimide (Ultem 1010/1000 from GE), 13.3 wt. % of polyvinylpyrrolidone (PVP K30 from ISP), and 67.7 wt. % of N-methylpyrrolidone (NMP). For this purpose the polyetherimide is first stirred into the NMP at a temperature of 70° C. and then homogeneously dissolved at 90° C. The PVP K30 is then added with stirring and likewise dissolved. The resulting solution is cooled to 50° C., degassed, filtered, and conveyed to the annular slit of a hollow-fibre die that is maintained at a temperature of 40° C. For the formation of the lumen and the separating layer, an interior filler consisting of 75 parts by weight of NMP and 25 parts by weight of water is extruded through the needle of the hollow-fibre die. The hollow fibre formed is conducted through a conditioning channel (50° C., relative humidity 90%) and precipitated and fixed in a water bath maintained at 70° C. After washing and drying a hollow-fibre membrane is obtained with a lumen diameter of 0.2 mm and a wall thickness of 0.035 mm.

EXAMPLE 7

A polyetherimide hollow-fibre membrane is produced as in comparative example 7, except that 0.5 wt. % of the polyelectrolyte Acrylidone ACP 1005 (from ISP), relative to the weight of interior filler, is also dissolved in the interior filler. To prepare the interior filler, the Acrylidone ACP 1005 is first dispersed in the NMP, water is then added, and a homogeneous solution prepared at approx. 70° C. The solution is finally cooled to 30° C.

Table 7 shows the $UFR_{Alb}$, $SC_{CC}$ and $SC_{Alb}$ of the hollow-fibre membranes of comparative example 7 and example 7.

TABLE 7

| Membrane from | Polyelectrolyte in the interior filler | $UFR_{Alb}$ ml/(h · m² · mmHg) | $SC_{Alb}$ | $SC_{CC}$ |
|---|---|---|---|---|
| Comparative example 7 | — | 36.0 | 0.003 | 0.690 |
| Example 7 | 0.5 wt. % of ACP 1005 | 30.5 | 0.001 | 0.840 |

COMPARATIVE EXAMPLE 8

A homogeneous spinning solution is prepared from 19.0 wt. % of polyphenylenesulfone (Radel R 5000 NT from Solvay), 13.3 wt. % of polyvinylpyrrolidone (PVP K30 from ISP), 64.32 wt. % of N-methylpyrrolidone (NMP), and 3.38 wt. % of water. For this purpose the polyphenylenesulfone is first stirred into the greater part of the NMP at a temperature of 70° C. and then homogeneously dissolved at 90° C. The PVP K30 is then added with stirring and likewise dissolved. The resulting solution is cooled to 50° C., and the water and the remaining NMP are then added. The homogeneous solution so obtained is degassed, filtered, and conveyed to the annular slit of a hollow-fibre die that is maintained at a temperature of 45° C. An interior filler consisting of 63 parts by weight of NMP and 37 parts by weight of water is extruded through the needle of the hollow-fibre die. The hollow fibre formed is conducted through a conditioning channel (50° C., relative humidity 90%), and precipitated in a coagulation bath containing water maintained at 70° C. After washing with water at 90° C. and drying, a hollow-fibre membrane results with a lumen diameter of 0.2 mm and a wall thickness of 0.035 mm. Table 8 shows the properties of the hollow-fibre membrane so obtained.

EXAMPLE 8

A polyphenylenesulfone hollow-fibre membrane is produced as in comparative example 8, except that 0.5 wt. % of the polyelectrolyte Acrylidone ACP 1005 (from ISP), relative to the weight of interior filler, is also dissolved in the interior filler. To prepare the interior filler, the Acrylidone ACP 1005 is first dispersed in the NMP, water is then added, and a homogeneous solution is prepared at approx. 70° C. The solution is finally cooled to 30° C.

Table 8 shows the $UFR_{Alb}$, $SC_{CC}$ and $SC_{Alb}$ for these hollow-fibre membranes.

TABLE 8

| Membrane from | Polyelectrolyte in the interior filler | $UFR_{Alb}$ ml/(h · m² · mmHg) | $SC_{Alb}$ | $SC_{CC}$ |
|---|---|---|---|---|
| Comparative example 8 | — | 30.7 | 0.001 | 0.470 |
| Example 8 | 0.5 wt. % of ACP 1005 | 33.3 | 0.000 | 0.840 |

COMPARATIVE EXAMPLE 9

A homogeneous spinning solution is prepared in a stirring vessel from 19.0 wt. % of polyethersulfone (Ultrason E 6020 from BASF), 13.3 wt. % of polyvinylpyrrolidone (PVP K30 from ISP), 62.96 wt. % of N-methylpyrrolidone (NMP) and 4.74 wt. % of water at a temperature of approx. 70° C. The spinning solution is then cooled to approx. 55° C., degassed, filtered, and conveyed to the annular slit of a hollow-fibre die that is maintained at a temperature of 45° C. For the formation of the lumen and the separating layer, an interior filler consisting of 54 parts by weight of NMP and 46 parts by weight of water is extruded through the needle of the hollow-fibre die. The hollow fibre formed is conducted through a conditioning channel (50° C., relative humidity 90%), and precipitated in a coagulation bath containing water maintained at 70° C. After washing with water at approx. 85° C. and drying in hot air, a hollow-fibre membrane results with a lumen diameter of 0.2 mm and a wall thickness of 0.035 mm.

EXAMPLES 9A-E

The dependence of the membrane characteristics on the concentration of polyelectrolyte contained in the interior filler is investigated. For this purpose, hollow-fibre membranes are produced as in comparative example 9, except that 0.01 to 0.25 wt. % of the polyelectrolyte Rohagit S hv (from Degussa/Röhm), relative to the weight of the interior filler, is also dissolved in the interior filler in each case. To prepare the interior filler in each case, the Rohagit S hv is first dispersed in the NMP and dissolved after addition of water at approx. 70° C., and the solution is then cooled to 30° C.

Table 9 shows the $UFR_{Alb}$, $SC_{CC}$ and $SC_{Alb}$ of the hollow-fibre membranes of comparative example 9 and examples 9a-e.

TABLE 9

| Membrane from | Polyelectrolyte in the interior filler | $UFR_{Alb}$ ml/(h · m² · mmHg) | $SC_{Alb}$ | $SC_{CC}$ |
|---|---|---|---|---|
| Comparative example 9 | — | 31.5 | 0.003 | 0.640 |
| Example 9a | 0.01 wt. % of Rohagit S hv | 32.9 | 0.002 | 0.820 |
| Example 9b | 0.025 wt. % of Rohagit S hv | 32.7 | 0.001 | 0.935 |

TABLE 9-continued

| Membrane from | Polyelectrolyte in the interior filler | UFR$_{Alb}$ ml/(h·m²·mmHg) | SC$_{Alb}$ | SC$_{CC}$ |
|---|---|---|---|---|
| Example 9c | 0.05 wt. % of Rohagit S hv | 31.1 | 0.001 | 0.960 |
| Example 9d | 0.10 wt. % of Rohagit S hv | 33.1 | 0.001 | 0.970 |
| Example 9e | 0.25 wt. % of Rohagit S hv | 32.9 | 0.001 | 0.970 |

It is seen that in the present example, no further improvement in membrane characteristics is obtained for concentrations above approx. 0.10 wt. % of Rohagit S hv in the interior filler.

COMPARATIVE EXAMPLE 10A

A homogeneous spinning solution is prepared by intensive mixing in a stirring vessel of 19.0 wt. % of polyethersulfone (Ultrason E 6020 from BASF), 13.3 wt. % of polyvinylpyrrolidone (PVP K30 from ISP), 62.96 wt. % of N-methylpyrrolidone (NMP) and 4.74 wt. % of water at a temperature of approx. 70° C. The resulting homogeneous solution is cooled to approx. 50° C., degassed, filtered, and conveyed to the annular slit of a hollow-fibre die that is maintained at a temperature of 45° C. An interior filler consisting of 54 parts by weight of NMP and 46 parts by weight of water is extruded through the needle of the hollow-fibre die. The hollow fibre formed is conducted through a conditioning channel (50° C., relative humidity 90%), and precipitated and fixed in a coagulation bath containing water maintained at approx. 63° C. After washing with water at 85° C. and drying in hot air, a hollow-fibre membrane results with a lumen diameter of 0.2 mm and a wall thickness of 0.03 mm. Table 10 shows the properties of the hollow-fibre membrane so obtained.

EXAMPLES 10A-D, COMPARATIVE EXAMPLE 10B

To investigate the effect of the polyelectrolyte concentration, hollow-fibre membranes are produced as in comparative example 10a, except that 0.01 to 0.25 wt. % of the polyelectrolyte Rohagit S ENV (from Degussa/Röhm), relative to the weight of the interior filler, is also dissolved in the interior filler. Rohagit S ENV is a copolymer of methacrylic acid and methyl methacrylate. To prepare the interior filler in each case, the Rohagit S ENV is first dispersed in the NMP, dissolved after addition of water at approx. 70° C., and then cooled to 30° C.

Table 10 shows the UFR$_{Alb}$, SC$_{CC}$ and SC$_{Alb}$ of the hollow-fibre membranes of comparative examples 10a and 10b and examples 10a-d.

TABLE 10

| Membrane from | Polyelectrolyte in the interior filler | UFR$_{Alb}$ ml/(h·m²·mmHg) | SC$_{ALB}$ | SC$_{CC}$ |
|---|---|---|---|---|
| Comparative example 10a | — | 28.9 | 0.002 | 0.640 |
| Comparative example 10b | 0.010 wt. % of Rohagit S ENV | 26.5 | 0.002 | 0.690 |
| Example 10a | 0.025 wt. % of Rohagit S ENV | 28.3 | 0.001 | 0.800 |
| Example 10b | 0.05 wt. % of Rohagit S ENV | 28.3 | 0.001 | 0.875 |
| Example 10c | 0.10 wt. % of Rohagit S ENV | 27.0 | 0.000 | 0.880 |
| Example 10d | 0.25 wt. % of Rohagit S ENV | 27.3 | 0.001 | 0.890 |

COMPARATIVE EXAMPLE 11A

A homogeneous spinning solution is prepared by intensive mixing in a stirring vessel of 19.0 wt. % of polyethersulfone (Ultrason E 6020 from BASF), 13.3 wt. % of polyvinylpyrrolidone (PVP K30 from ISP), 62.96 wt. % of N-methylpyrrolidone (NMP), and 4.74 wt. % of water at a temperature of approx. 70° C. The resulting solution is then cooled to approx. 50° C., degassed, filtered, and conveyed to the annular slit of a hollow-fibre die that is maintained at a temperature of 45° C. For the formation of the lumen and the inner separating layer, an interior filler consisting of 54 parts by weight of NMP and 46 parts by weight of water is extruded through the needle of the hollow-fibre die. The hollow fibre formed is conducted through a conditioning channel (50° C., relative humidity 90%), and precipitated and fixed in a coagulation bath containing water maintained at approx. 67° C. After washing with water at 85° C. and drying in hot air, a hollow-fibre membrane results with a lumen diameter of 0.2 mm and a wall thickness of 0.035 mm.

EXAMPLES 11A-D, COMPARATIVE EXAMPLE 11B

Various hollow-fibre membranes are produced as in comparative example 11a, except that 0.01 to 0.25 wt. % of the polyelectrolyte Acrylidone ACP 1005 (from ISP), relative to the weight of interior filler, is also dissolved in the interior filler. To prepare the interior filler in each case, the Acrylidone ACP 1005 is first dispersed in the NMP, water is then added, and a homogeneous solution is prepared at approx. 70° C. The solution is finally cooled to 30° C.

Table 11 shows the UFR$_{Alb}$, SC$_{CC}$ and SC$_{Alb}$ of the hollow-fibre membranes of comparative examples 11a and b and examples 11a-d.

TABLE 11

| Membrane from | Polyelectrolyte in the interior filler | UFR$_{Alb}$ ml/(h·m²·mmHg) | SC$_{Alb}$ | SC$_{CC}$ |
|---|---|---|---|---|
| Comparative example 11a | — | 36.1 | 0.002 | 0.632 |
| Comparative example 11b | 0.01 wt. % of ACP 1005 | 42.5 | 0.004 | 0.784 |
| Example 11a | 0.025 wt. % of ACP 1005 | 40.1 | 0.005 | 0.830 |
| Example 11b | 0.05 wt. % of ACP 1005 | 39.6 | 0.003 | 0.889 |
| Example 11c | 0.10 wt. % of ACP 1005 | 38.8 | 0.001 | 0.912 |
| Example 11d | 0.25 wt. % of ACP 1005 | 33.6 | 0.000 | 0.968 |

COMPARATIVE EXAMPLES 12A-F

A homogeneous spinning solution is prepared with intensive mixing in a stirring vessel of 19.0 wt. % of polyethersulfone (Ultrason E 6020 from BASF), 13.3 wt. % of polyvinylpyrrolidone (PVP K30 from ISP), 62.96 wt. % of N-methylpyrrolidone (NMP) and 4.74 wt. % of water at a temperature of approx. 70° C. The solution is cooled to approx. 50° C., filtered, degassed and conveyed to the annular slit of a hollow-fibre die that is maintained at a temperature of 45° C. For the formation of the lumen and the inner separating layer, an interior filler consisting of NMP and water is extruded through the needle of the hollow-fibre die. Six different membranes are produced, the composition of the interior filler being varied stepwise with the NMP:water ratio ranging between 48:52 and 58:42 wt. %. The hollow fibre formed in each case is conducted through a conditioning channel (50° C., relative humidity 90%) and precipitated in a water bath maintained at approx. 70° C. After washing with water at 80° C. and drying in hot air, hollow-fibre membranes result with a lumen diameter of 0.2 mm and a wall thickness of 0.035 mm.

EXAMPLES 12A-F

Hollow-fibre membranes are produced as in comparative examples 12a-f, except that 0.1 wt. % of the polyelectrolyte Rohagit S hv (from Degussa/Röhm), relative to the weight of the interior filler, is also dissolved in the interior filler in each case. To prepare the interior filler in each case, the Rohagit S hv is first dispersed in the NMP and dissolved after addition of water at approx. 70° C., and the solution is then cooled to 30° C.

Table 12 shows the $UFR_{Alb}$, $SC_{CC}$ and $SC_{Alb}$ of the hollow-fibre membranes of comparative examples 12a-f and examples 12a-f.

TABLE 12

| Membrane from | NMP:water | $UFR_{Alb}$ ml/(h·m²·mmHg) | $SC_{ALB}$ | $SC_{CC}$ |
|---|---|---|---|---|
| Comparative example 12a | 48:52 | 26.3 | 0.001 | 0.550 |
| Comparative example 12b | 50:50 | 33.7 | 0.003 | 0.660 |
| Comparative example 12c | 52:48 | 36.5 | 0.009 | 0.740 |
| Comparative example 12d | 54:46 | 42.4 | 0.027 | 0.780 |
| Comparative example 12e | 56:44 | 45.9 | 0.047 | 0.810 |
| Comparative example 12f | 58:42 | 57.8 | 0.075 | 0.860 |
| Example 12a | 48:52 | 24.0 | 0.001 | 0.960 |
| Example 12b | 50:50 | 30.0 | 0.000 | 0.920 |
| Example 12c | 52:48 | 33.1 | 0.001 | 0.980 |
| Example 12d | 54:46 | 42.5 | 0.002 | 0.980 |
| Example 12e | 56:44 | 47.5 | 0.001 | 0.970 |
| Example 12f | 58:42 | 52.4 | 0.000 | 0.950 |

Table 12 shows that, for the same NMP:water ratio, membranes have a considerably higher selectivity for separation of albumin and cytochrome c if just 0.1 wt. % of the polyelectrolyte Rohagit S hv is added to the interior filler during membrane production. If the polyelectrolyte Rohagit S hv is not added, high sieving coefficients for cytochrome c can be attained only if high sieving coefficients for albumin are tolerated.

COMPARATIVE EXAMPLE 13

A homogeneous spinning solution is prepared by intensive mixing in a stirring vessel of 19.0 wt. % of polyethersulfone (Ultrason E 6020 from BASF), 13.3 wt. % of polyvinylpyrrolidone (PVP K30 from ISP), 62.96 wt. % of N-methylpyrrolidone (NMP) and 4.74 wt. % of water at a temperature of approx. 70° C. The solution is then cooled to approx. 50° C., degassed, filtered, and conveyed to the annular slit of a hollow-fibre die that is maintained at a temperature of 45° C. An interior filler consisting of 52 parts by weight of NMP and 48 parts by weight of water is extruded through the needle of the hollow-fibre die. The hollow fibre formed is conducted through a conditioning channel (50° C., relative humidity 90%), and precipitated in a coagulation bath containing water maintained at approx. 75° C. After washing with water at 80° C. and drying in hot air, a hollow-fibre membrane results with a lumen diameter of 0.2 mm and a wall thickness of 0.035 mm.

EXAMPLE 13

A hollow-fibre membrane is produced as in comparative example 13, except that 0.25 wt. % of the polyelectrolyte Rohagit S ENV (from Degussa/Röhm), relative to the weight of the interior filler, is also dissolved in the interior filler. To prepare the interior filler in each case, the Rohagit S ENV is first dispersed in the NMP, dissolved after addition of water at approx. 70° C., and then cooled to 30° C.

Table 13 shows the properties of the hollow-fibre membranes of comparative example 13 and example 13.

TABLE 13

| Membrane from | Polyelectrolyte in the interior filler | $UFR_{Alb}$ ml/(h·m²·mmHg) | $SC_{Alb}$ | $SC_{CC}$ |
|---|---|---|---|---|
| Comparative example 13 | — | 31.5 | 0.003 | 0.640 |
| Example 13 | 0.25 wt. % of Rohagit S ENV | 35.1 | 0.000 | 1.000 |

EXAMPLE 14

A homogeneous spinning solution is prepared by intensive stirring of 19.0 wt. % of polyethersulfone (Ultrason E 6020 from BASF), 13.3 wt. % of polyvinylpyrrolidone (PVP K30 from ISP), 62.96 wt. % of N-methylpyrrolidone (NMP), and 4.74 wt. % of water at a temperature of approx. 60° C. The resulting homogeneous solution is cooled to approx. 50° C., degassed, filtered, and conveyed to the annular slit of a hollow-fibre die that is maintained at a temperature of 45° C. An interior filler consisting of 52 parts by weight of NMP and 48 parts by weight of water, and with an addition of 0.1 wt. %, relative to the weight of the interior filler, of the polyelectrolyte Carbopol 1382 (from Noveon) is extruded through the needle of the hollow-fibre die. To produce the interior filler, the Carbopol 1382 is first dispersed in NMP and then dissolved after addition of water at approx. 70° C. The hollow fibre formed is conducted through a conditioning channel (55° C., relative humidity 80%), and precipitated in a coagulation bath containing water maintained at approx. 71° C. After washing with water at 90° C. and drying in hot air, a hollow-fibre membrane results with a lumen diameter of 0.2 mm and a wall thickness of 0.03 mm. Table 14 shows the properties of this hollow-fibre membrane.

TABLE 14

| Membrane from | Polyelectrolyte in the interior filler | $UFR_{Alb}$ ml/(h·m²·mmHg) | $SC_{Alb}$ | $SC_{CC}$ |
|---|---|---|---|---|
| Example 14 | 0.1 wt. % of Carbopol 1382 | 35.82 | 0.002 | 0.956 |

EXAMPLES 15A-B

A homogeneous spinning solution is prepared by intensive stirring of 19.0 wt. % of polyethersulfone (Ultrason E 6020 from BASF), 13.3 wt. % of polyvinylpyrrolidone (PVP K30 from ISP), 62.96 wt. % of N-methylpyrrolidone (NMP), and 4.74 wt. % of water at a temperature of approx. 60° C. The solution is degassed, filtered and conveyed to the annular slit of a hollow-fibre die that is maintained at a temperature of 45° C. For the formation of the lumen and the separating layer, interior fillers consisting respectively of 55.95 parts by weight of NMP, 43.95 parts by weight of water, and 0.1 part by weight of the polyelectrolyte Styleze 2000 (from ISP) (example 19a), and of 55.88 parts by weight of NMP, 43.87 parts by weight of water, and 0.25 parts by weight of Styleze 2000 (example 19b) are extruded through the needle of the hollow-fibre die. To produce the interior filler, the Styleze 2000 is first stirred into NMP and then dissolved after addition of water at 70° C. Styleze 2000 is a copolymer of acrylic acid, vinylpyrrolidone and lauryl methacrylate. The hollow fibre formed is conducted through a conditioning channel (55° C., relative humidity 70%), and precipitated in a coagulation bath containing water maintained at approx. 65° C. After washing with water at 90° C. and drying in hot air, a hollow-fibre membrane results with a lumen diameter of 0.2 mm and a wall thickness of 0.03 mm, of which the $UFR_{Alb}$, $SC_{CC}$ and $SC_{Alb}$ are shown in Table 15.

TABLE 15

| Membrane from | Polyelectrolyte in the interior filler | $UFR_{Alb}$ ml/(h · m² · mmHg) | $SC_{Alb}$ | $SC_{CC}$ |
|---|---|---|---|---|
| Example 15a | 0.1 wt. % of Styleze 2000 | 36.04 | 0.001 | 0.931 |
| Example 15b | 0.25 wt. % of Styleze 2000 | 38.09 | 0.001 | 0.937 |

The invention claimed is:

1. A semipermeable hollow-fibre membrane, particularly for use in hemodialysis, hemodiafiltration and hemofiltration, comprising
   a hydrophilic, water-wettable membrane being based on
      a hydrophobic first polymer being selected from the group consisting of an aromatic sulfone polymer, a polycarbonate, polyimide, polyetherimide, polyetherketone, polyphenylene sulfide, or a copolymer or a modification of these polymers, or a mixture of these polymers and
      a hydrophilic second polymer being selected from the group consisting of polyvinylpyrrolidone, polyethylene glycol, polyvinyl alcohol, polyglycol monoester, polysorbate, carboxymethylcellulose, or a modification or copolymer of these polymers,
   possessing an open-pored, integrally asymmetric structure across its wall with a porous separating layer of thickness 0.1 to 2 µm on its inner surface facing a lumen and an open-pored supporting layer adjoining the separating layer,
   characterized in that a polyelectrolyte with negative fixed charges is physically bound in the separating layer,
   characterized in that the supporting layer being essentially free from polyelectrolyte with negative fixed charges, and
   having an ultrafiltration rate in albumin solution in the range of 25 to 60 ml/(h·m²·mmHg),
   wherein after drying, the hollow-fibre membrane has a minimum sieving coefficient for cytochrome c of 0.8 combined with a maximum sieving coefficient for albumin of 0.005, and
   whereby the hollow-fibre membrane in the dry state is free from pore-stabilising additives in the membrane wall.

2. Hollow-fibre membrane according to claim 1 characterized in that the aromatic sulfone polymer being selected from the group consisting of polysulfone, polyethersulfone, polyphenylenesulfone or polyarylethersulfone.

3. Hollow-fibre membrane according to claim 1, characterized in that the hydrophobic first polymer is a polysulfone or a polyethersulfone.

4. Hollow-fibre membrane according to claim 1, characterized in that the supporting layer extends from the separating layer across essentially the entire wall of the hollow-fibre membrane, has a sponge-like structure and is free from finger pores.

5. Hollow-fibre membrane according to claim 1, characterized in that it has a minimum sieving coefficient for cytochrome c of 0.85.

6. Hollow-fibre membrane according to claim 1, characterized in that it has a maximum sieving coefficient for albumin of 0.003.

7. Hollow-fibre membrane according to claim 1, with an ultrafiltration rate in albumin solution in the range of 30 to 55 ml/(h·m²·mmHg).

* * * * *